A. PFOSER.
PROCESS OF CONVEYING AIR FOR COMBUSTION OR GAS.
APPLICATION FILED AUG. 21, 1912.
1,131,952.
Patented Mar. 16, 1915
4 SHEETS—SHEET 1.
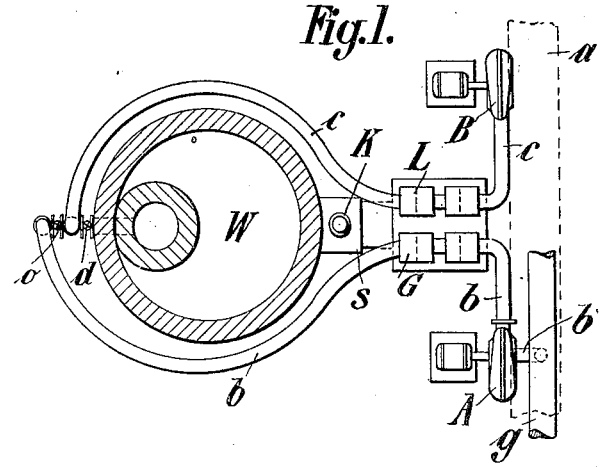
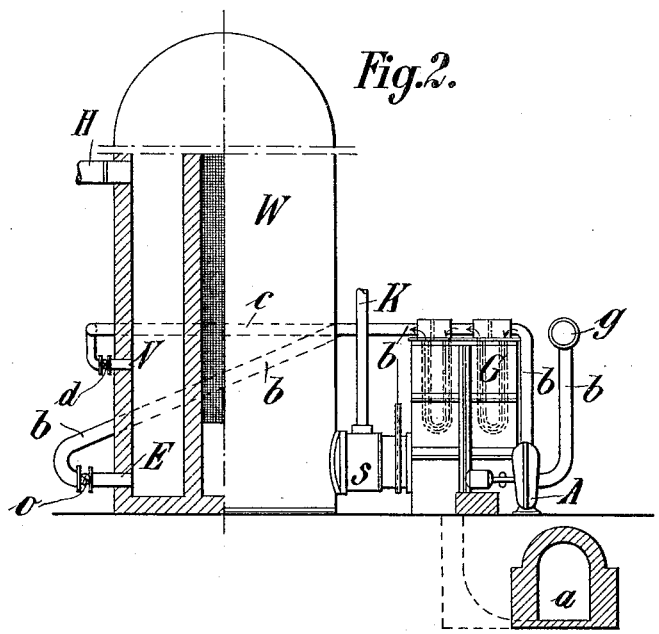

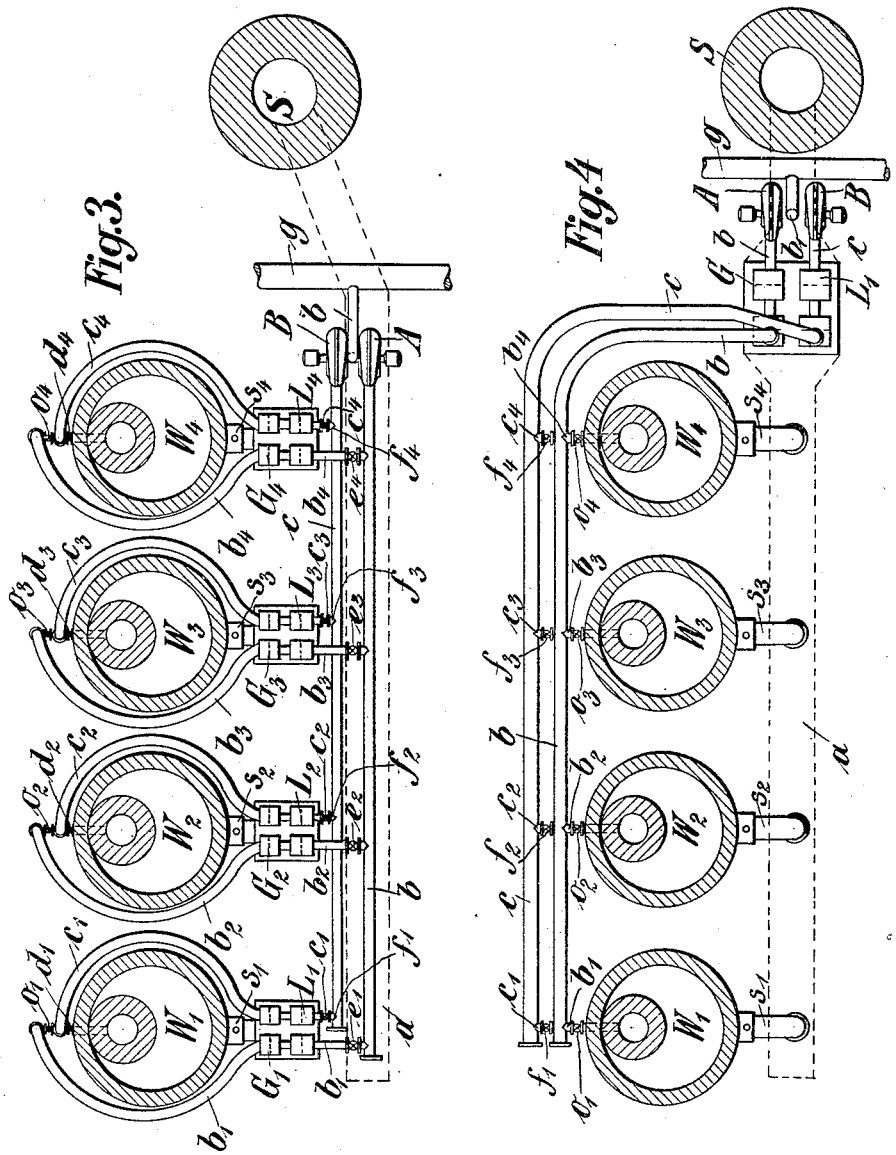

A. PFOSER.
PROCESS OF CONVEYING AIR FOR COMBUSTION OR GAS.
APPLICATION FILED AUG. 21, 1912.

1,131,952.

Patented Mar. 16, 1915.
4 SHEETS—SHEET 3.

Witnesses:
B. Sommers
E. Leckert.

Inventor,
Adolf Pfoser.
By Hauworth Jr
Atty

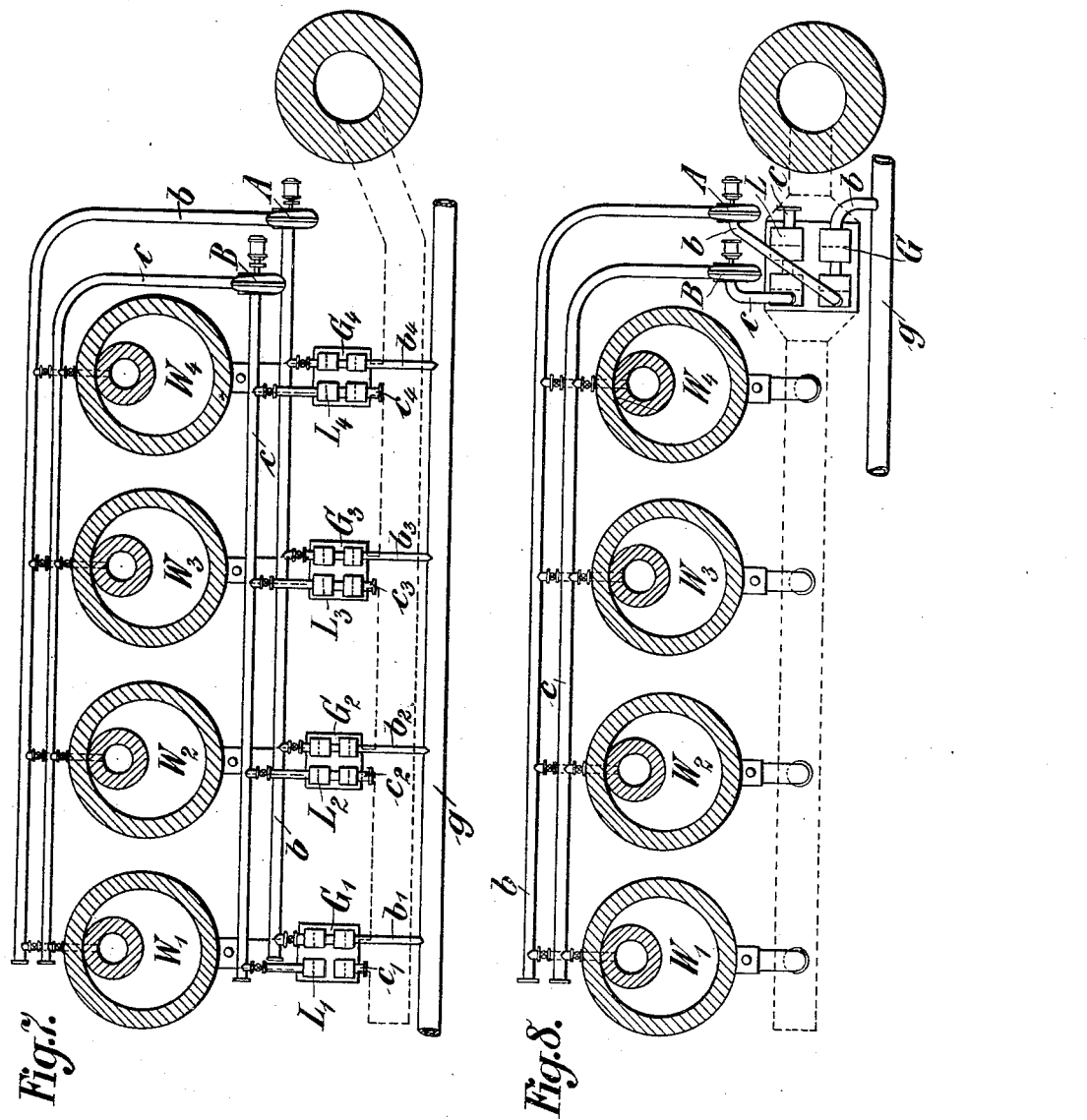

UNITED STATES PATENT OFFICE.

ADOLF PFOSER, OF ACHERN, GERMANY.

PROCESS OF CONVEYING AIR FOR COMBUSTION OR GAS.

1,131,952. Specification of Letters Patent. Patented Mar. 16, 1915.

Application filed August 21, 1912. Serial No. 716,207.

*To all whom it may concern:*

Be it known that I, ADOLF PFOSER, a subject of the Grand Duke of Baden, residing at and whose post-office address is 19 Sasbacherstrasse, Achern, Germany, have invented certain new and useful Improvements in Processes of Conveying Air for Combustion or Gas; and I do hereby declare the following to be a full, clear, and exact description of the invention.

My invention relates to a method of controlling hot blast systems for furnaces and thereby controlling the operation of the furnace or furnaces dependent upon said system. In all such modern systems, checker brick regenerative devices are used generally termed by furnace men, hot blast stoves or simply "stoves" and this term will hereinafter be used by me in the following description.

An important object of my invention is to preliminarily heat the combustion air or furnace gas or both of these media, in waste heat utilizers being heated by the waste gases or products of combustion from the stoves as they pass to the stack. I also assist or control the natural draft of the stack by forcing one or the other or both media along their course of travel to the stack. In other words, I boost the natural draft of the stack by boosting the combustion air or the furnace gas or both through the stoves or decrease the draft of the stack and this I do by blowers located either ahead of the waste heat utilizers or between the waste heat utilizers and the stoves.

Apparatus for carrying my invention into practice will now be explained with reference to the accompanying drawings, in which—

Figure 5:
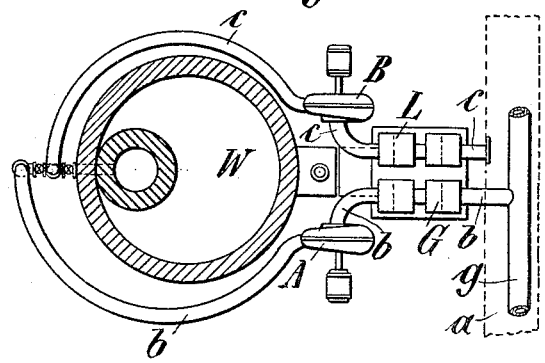
Figure 6:
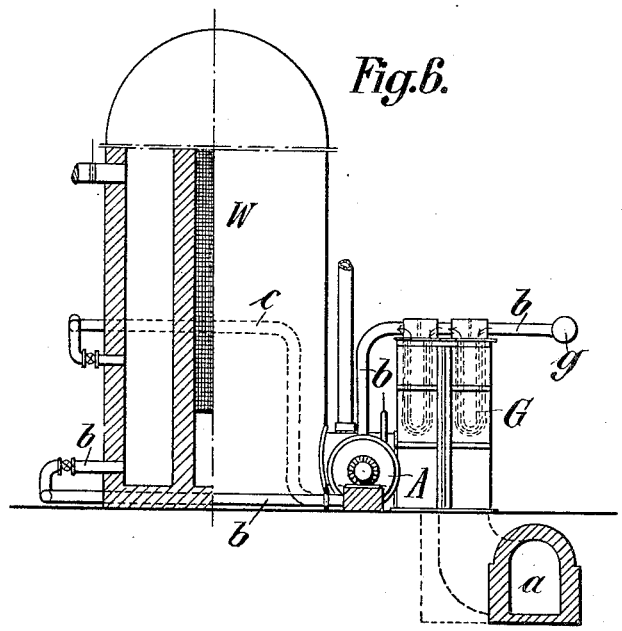

Figures 1 to 4 show constructions in which the blowers are connected in front of the waste heat utilizers and drive the gas and the combustion air through the waste heat utilizers for preliminarily heating into the stoves while Figs. 5 to 8 show constructions in which the blowers are connected between the waste heat utilizers and the stoves in order to draw the furnace gas and the combustion air through the waste heat utilizers and to force them through the stoves. Fig. 1 is a horizontal section, Fig. 2 a sectional elevation showing one arrangement, Figs. 3 and 4 are horizontal sections showing modifications thereof, Fig. 5 is a horizontal section, Fig. 6 is a vertical sectional elevation showing another arrangement, and Figs. 7 and 8 are horizontal sections showing modifications of the latter arrangement.

Referring firstly to Figs. 1 and 2, W designates a stove, L is the waste heat utilizer heated by the waste gases from the stove for preliminarily heating the combustion air, hereinafter called the air-heater, and G the waste heat utilizer also heated by the waste gases from the stove for preliminarily heating the blast furnace gas and hereinafter called the gas-heater. The waste gases pass out of the stove W through the pipe $s$ to the air-heater L and to the gas-heater G into the waste-gas flue $a$. K designates the cold blast pipe, H the hot blast pipe, E the furnace gas inlet, and V the inlet for combustion air. A designates the blower which receives furnace gas through the pipe $b$ from the furnace gas-main $g$, and forces it through the pipe $b$ and the gas-heater G to the combustion chamber of the stove W. This pipe is provided at its inlet into the stove with a valve $o$. The quantity of gas supplied to the stove is regulated both by the speed of the blower and also by the valve $o$. The blower B drives the air for combustion through the pipe $c$ to the air-heater L to be preliminarily heated and thence to the stove. This pipe $c$ is likewise provided at its inlet into the stove with a valve $d$. The supply of large or small quantities of air is also regulated both by the speed of the blower and also by the valve $d$. The draft of the smoke-stack can be increased or diminished according to the speeds of the two blowers, which speeds are, of course, so adjusted that the mixture of furnace gas and combustion air is adapted to the best possible combustion, and consequently any desired large or small quantity of preliminarily heated gas and heated combustion air can be sent through the stove. The waste gases which pass out of the stove on their way to the stack, heat the gas and air heaters G and L and are thereby utilized.

Figs. 1 and 2 show an arrangement in which each stove has its own air and gas heaters, as is also the case in the modification shown in Fig. 3. In the latter figure, $W_1$, $W_2$, $W_3$, $W_4$, designate the stoves, $L_1$, $L_2$, $L_3$, $L_4$, are the corresponding air-heaters and $G_1$, $G_2$, $G_3$, $G_4$, the corresponding gas-heaters. $s_1$, $s_2$, $s_3$, $s_4$, are the discharge pipes for waste gas from the stoves and $a$ is the flue common to all the stoves leading to the smoke-stack S. A denotes the common gas-blower for the four Cowper stoves W which receives the gas from the gas main $g$ through the pipe $b$ and forces it from here through a common pipe $b$ and the branch pipes $b_1$, $b_2$, $b_3$, $b_4$, through the gas heaters, in which the gas is pre-heated on its way through the pipes $b_1$, $b_2$, $b_3$, $b_4$, to the stoves. These pipes $b_1$, $b_2$, $b_3$, $b_4$, are provided with valves $o_1$, $o_2$, $o_3$, $o_4$, respectively. The branch pipes $b_1$, $b_2$, $b_3$, $b_4$, are provided at the common gas pipe $b$ with valves $e_1$, $e_2$, $e_3$, $e_4$, by which the gas can be shut off when the stove in question is in blast. The object of the valves $o_1$, $o_2$, $o_3$, $o_4$, is to regulate the supply of the gas, which is also possible by adjusting the speed of the blower. B designates the common blower for conveying combustion air through a common air-pipe $c$, and branch pipes, $c_1$, $c_2$, $c_3$, $c_4$, to the air heaters $L_1$, $L_2$, $L_3$, $L_4$, of the stoves. The branch pipes $c_1$, $c_2$, $c_3$, $c_4$, are each provided when entering into the stoves with a valve $d_1$, $d_2$, $d_3$, $d_4$, respectively, by which the supply of air can be regulated. These branch pipes likewise have closure members, $f_1$, $f_2$, $f_3$, $f_4$, by which the supply of air to the air-heaters can be cut off when the appertaining stove is in blast. By means of this arrangement it is possible to convey any desired quantity of preliminarily heated gas and heated combustion air into the stove that is to be supplied with gas and air, and to diminish or increase the draft of the smoke-stack in accordance with the volume of waste gases.

Fig. 4 shows the arrangement of one common air-heater $L_1$ and one common gas-heater G for several stoves $W_1$, $W_2$, $W_3$, $W_4$. A denotes the blower for conveying the gas, and B the blower for conveying the air for combustion. The waste gases pass through the short pipes $s_1$, $s_2$, $s_3$, $s_4$, into the common flue $a$ and by way of the gas and air heaters G and L to the smoke-stack S. The blower for gas receives gas from the gas-main $g$ and forces it through the pipe $b$ into the gas-heater G, where the gas is heated and is then conveyed through the common gas-pipe $b$ to the stoves. Branches $b_1$, $b_2$, $b_3$, $b_4$, lead from this common gas-pipe $b$ to the gas-inlets of the individual Cowper stoves, these branches being provided with valves $o_1$, $o_2$, $o_3$, $o_4$, by which the quantity of gas supplied is regulated as desired and can be stopped when the stove in question is in blast. The air is forced by the blower B by way of the air heater L and the common pipe $c$ to the stoves. Branches $c_1$, $c_2$, $c_3$, $c_4$, lead from this common air-pipe to the air inlets of the separate Cowper stoves, these branches are provided with valves $f_1$, $f_2$, $f_3$, $f_4$ by which the supply of the preliminarily heated air can be regulated and the stoves can be cut off when reversed for blast. By means of the arrangement according to Fig. 4, it is possible by regulating the blowers and closure members to convey not only regulable volumes of gas and of air preliminarily heated as desired to any number of stoves, and to bring about an increase or decrease in the draft of the smoke-stack.

Referring to Figs. 5 and 6, the blower A connected in the pipe $b$ sucks gas from the gas-main $g$ through the gas-heater G and discharges the heated gas into stove W. The blower B connected in the pipe $c$ sucks air through the air-heater L, in which the air is preliminarily heated, and discharges it into the stove. Here also valves are provided as described above with reference to Figs. 1 and 2 for controlling the supply of combustion air and gas to the stove. By means of this arrangement it is also possible not only to convey any desired quantities of heated gas and air into the stove by means of the blowers connected between the waste heat utilizers and the stoves by varying the speed of the blowers and additionally control said quantities by means of the valves, but also to increase or diminish the draft of the stack.

In Fig. 7, the reference characters $W_1$, $W_2$, $W_3$, $W_4$, represent the stoves to which the air-heaters $L_1$, $L_2$, $L_3$, $L_4$ and the gas-heaters $G_1$, $G_2$, $G_3$, $G_4$, belong, so that each stove has its own gas-heater and air-heater. A designates the common gas-blower for the four Cowper stoves which sucks the gas from the branch pipes $b_1$, $b_2$, $b_3$, $b_4$ out of the gas pipe $b$ and through the gas-heaters $G_1$, $G_2$, $G_3$, $G_4$, into a common gas pipe $b$ and forces it through this to the individual stoves. B is the common blower for conveying the combustion air which is sucked from the pipes $c_1$, $c_2$, $c_3$, $c_4$, through the air-heaters $L_1$, $L_2$, $L_3$, $L_4$, in which it is preliminarily heated, and into the common pipe $c$, through which the air is forced to the individual stoves. The gas-heaters and the air-heaters are here likewise heated by waste gas from the stoves. The pipes are here likewise provided with valves in such manner that the volume of air passing through the various air-heaters and gas-heaters can be regulated or stopped when the appertaining stove is in blast. It is likewise possible by means of this arrangement not only to convey any desired quantities of preliminarily heated gas and air into stoves connected as desired to the gas supply, but also to increase or diminish the draft of the smoke-stack as desired.

Fig. 8 shows the arrangement of one common air-heater and one common gas-heater for several stoves. $W_1$, $W_2$, $W_3$, $W_4$, denote the stoves, L designates the common air-heater and G the common gas-heater, both of which are heated by waste gases. A denotes the common blower for conveying gas. This blower sucks the gas by way of the pipe $b$ from the gas main $g$, and through the gas-heater, in which it is preliminarily heated and forces it by way of the individual connecting pipes into the stoves. B designates the common blower for conveying the preliminarily heated air for combustion. It sucks the air from the pipe $c$ through the air-heater L, in which the air is preliminarily heated, and supplies it to the individual stoves. The gas pipes and air pipes are likewise provided with valves in such manner that the gas and air can be regulated, and the stoves in blast can be disconnected. By means of the arrangement last described in Fig. 8, it is likewise possible not only to convey any desired quantities of preliminarily heated, gas and air to stoves, connected as desired to the gas supply, by regulating the speed of the blowers and by regulating the valves, but also to increase or diminish the draft of the smoke-stack.

By the use of my invention I am able to obtain either an increase of temperature of the blast, for the purpose of saving coke in or increasing the capacity of the blast-furnace, or for the purpose of obviating disturbances in the working of the blast-furnace, or for saving gas, or for both increasing the temperature of the blast and for saving gas, by employing either the combustion air or the gas or both, heated above their normal temperatures in stoves. I attain this end by regulating the supply of combustion air and gas to stoves, the one medium, $i.$ $e.$ air for combustion or gas, or both media, being preliminarily heated. When regulating the quantities of gas and air in this manner the aim is, of course, in all cases, to obtain the best possible combustion in the stoves, thus the least excess of air.

As is well known, in the case of disturbances in the working of blast-furnaces it is most important to provide for as high temperatures of the blast as possible, and this can likewise be obtained most quickly by the well known regulation.

The temperature of the blast is raised in order to save coke, or to increase the capacity of the blast-furnace, or to obviate disturbances in the working of the blast furnace, by supplying that quantity of air for combustion and gas to the stoves which was requisite heretofore, or larger quantities thereof, the best possible combustion being attained. The greater the quantities of waste gas from the stoves, the greater will be the temperature of the waste gas when entering and leaving the waste heat utilizers, consequently the greater will be the temperatures imparted to the combustion air and gas by the waste heat utilizers and, consequently, the maximum temperature of combustion will be obtained in the stoves.

The production of blast furnace gas is reduced by maintaining the normal temperature of the blast, thus the customary combustion of coke. To this end, I supply the heaters or stoves with the minimum quantities of preliminarily heated combustion air and heated gas, the combustion being the best possible. This produces minimum quantities of waste gas, the lowest temperatures of the waste gases entering and leaving the waste heat utilizers, minimum temperatures supplied to the combustion air and to the gas by the waste heat utilizers, and consequently, minimum temperatures of combustion in the stove are obtained.

If a predetermined quantity of blast furnace gas and coke is to be saved, the supply of the preliminarily heated combustion air and gas supplied to the stoves must likewise be regulated correctly for the best possible combustion corresponding to the intermediate conditions between the volumes supplied for maximum temperature of the blast and volumes supplied for the maximum saving of blast furnace gas. From this it follows that in order to obtain an increase of temperature of the blast, or a saving of blast furnace gas, or both, as desired, by employing the preliminarily heated air for combustion, or gas, or both preliminarily heated media in the stoves, it must be possible to regulate as desired both the supply of the gas with the necessary air for combustion and the resulting varying larger or smaller quantities of waste gas of higher or lower temperatures. This regulation is likewise effected by the blowers which simultaneously serve for conveying the preliminarily heated combustion air, or gas, or both preliminarily heated media, said blowers being connected either in front of the waste heat utilizers or between the latter and the stoves, and any desired increase or decrease in the draft of the smoke-stack can be caused. By adjusting both the speed of the blowers and also the valves for shutting off gas and air it is possible to completely regulate not only the supply of gas and air to the stoves, but also the quantities of waste gas discharged, and by employing preliminarily heated air for combustion, or gas, or both media, either an increase of temperature of the blast, or a saving of blast furnace gas, or both, can be obtained. In most cases such conveyance and regulation is impossible with the natural and artificial suction draft, because in the case of the natural draft through the smoke-stack, when the waste gases are greatly cooled by the waste heat utilizers, the requisite draft for the suction of the waste gas is no longer at disposal. This is also the case with the artificial suction draft, the suction of air for combustion, or gas, both media, through the waste heat utilizer is impossible in most cases owing to frictional losses, and the desired supply of air for combustion and gas or both media, would have to be conveyed through the waste heat utilizer by means of special blowers.

I claim.

1. The method of controlling hot blast systems using air and gas as combustion media, which comprises preliminarily heating one of the combustion media by waste heat utilizers for the waste gases from hot blast stoves, forcing said medium by means of blowers through the waste heat utilizers and stoves and thereby controlling and boosting the stack draft by the speed of the blowers.

2. The method of controlling hot blast systems using air and gas as combustion media, which comprises preliminarily heating said media in separate waste heat utilizers for the waste gases from the stoves, and forcing said media by separate blowers through the waste heat utilizers and stoves, thereby controlling the volume of media by the speed of the blowers and controlling and boosting the stack draft.

3. In a hot blast system, the combination with a hot blast stove, of a heat exchange through which the products of combustion of said stove pass, and a blower for causing one of the combustion media to pass through both the utilizer and stove.

4. In a hot blast system, the combination with a hot blast stove, of two heat exchangers through which the products of combustion pass to heat the same, two blowers, one for causing air to pass through one of the utilizers and the stove, and the other for causing gas to pass through the other to the stove, whereby the volume and proportion of gas mixture is controlled by the speed of the blowers, and the stack draft simultaneously controlled.

5. The method of controlling hot blast systems using air or gas as combustion media, which comprises storing the heat of the waste gases from the hot blast stoves, drawing said media through the supply of said heat and forcing it into the stoves for combustion and controlling the rate and volume of pre-heated media supplied to said stoves.

In testimony that I claim the foregoing as my invention, I have signed my name in presence of two subscribing witnesses.

ADOLF PFOSER.

Witnesses:
AUGUST OOSTERMAN,
JULIUS SCHIERENBECK.

Copies of this patent may be obtained for five cents each, by addressing the "Commissioner of Patents, Washington, D. C."